(12) United States Patent
Hahnlen

(10) Patent No.: US 11,337,370 B2
(45) Date of Patent: May 24, 2022

(54) ENGINE MOUNTING STRUCTURE FOR WALK-BEHIND WHEELED MACHINE

(71) Applicant: Honda Motor Co., Ltd., Tokyo (JP)

(72) Inventor: Ryan M. Hahnlen, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 258 days.

(21) Appl. No.: 16/822,578

(22) Filed: Mar. 18, 2020

(65) Prior Publication Data

US 2021/0289698 A1 Sep. 23, 2021

(51) Int. Cl.
*A01D 34/82* (2006.01)
*A01D 34/00* (2006.01)
*A01D 101/00* (2006.01)

(52) U.S. Cl.
CPC ........... *A01D 34/82* (2013.01); *A01D 34/001* (2013.01); *A01D 2101/00* (2013.01)

(58) Field of Classification Search
CPC ........ F16F 1/3732; F16F 1/3735; F16F 15/08; A01D 2101/00; A01D 34/001; A01D 34/81; A01D 34/82; A01D 34/905; A01D 34/826
See application file for complete search history.

(56) References Cited

U.S. PATENT DOCUMENTS

| | | | | |
|---|---|---|---|---|
| 1,729,394 A * | 9/1929 | Lee | ........................ | F16F 1/3732 248/621 |
| 3,052,435 A | 12/1960 | Roller | | |
| 3,456,430 A * | 7/1969 | Maloney | ............... | A01D 34/822 56/12.8 |
| 3,545,706 A * | 12/1970 | Harshman | ................ | B60K 5/06 248/604 |
| 3,841,425 A * | 10/1974 | Harkness | ................ | F02B 75/16 180/53.1 |
| 3,888,450 A | 6/1975 | Seilenbinder | | |
| 3,970,272 A * | 7/1976 | Kaesgen | ............. | B60K 5/1225 248/611 |
| 4,306,708 A * | 12/1981 | Gassaway | ................ | F24F 1/10 267/141.3 |

(Continued)

FOREIGN PATENT DOCUMENTS

| | | |
|---|---|---|
| CN | 203796430 | 8/2014 |
| DE | 10348975 | 5/2005 |

(Continued)

*Primary Examiner* — Adam J Behrens
(74) *Attorney, Agent, or Firm* — Rankin, Hill & Clark LLP

(57) ABSTRACT

A manually operated wheeled machine includes a housing and an engine mounted to the housing via a mounting structure. The mounting structure includes a tubular spacer defining a through hole. The spacer has a first end directly abutting the engine and a second end inserted in a mounting hole extended through the housing. The second end of the spacer is offset axially inwardly from a lower surface of the housing. A damping element axially mounted to the spacer is directly engaged to the first end of the spacer. A washer axially mounted to the spacer is interposed between and directly contacts each of the damping element and an upper surface of the housing. A fastener is extended through mounting hole and the spacer from the lower surface of the housing for connection with the engine.

17 Claims, 4 Drawing Sheets

(56) References Cited

U.S. PATENT DOCUMENTS

| | | | |
|---|---|---|---|
| 4,530,491 A * | 7/1985 | Bucksbee | F16F 1/3732 267/141 |
| 4,570,911 A | 2/1986 | Konishi | |
| 4,588,174 A | 5/1986 | Konishi | |
| 4,809,959 A | 3/1989 | Hourlier | |
| 4,813,218 A | 3/1989 | Claesson | |
| 5,178,375 A | 1/1993 | Hamaekers et al. | |
| 5,365,725 A | 11/1994 | McCance | |
| 5,862,654 A * | 1/1999 | Thier | A01D 34/42 56/249 |
| 6,227,784 B1 * | 5/2001 | Antoine | F02B 77/00 411/11 |
| 6,471,179 B1 * | 10/2002 | Tousi | F16F 1/3732 248/634 |
| 7,735,812 B2 * | 6/2010 | Fitzgerald | F16F 1/3732 267/293 |
| 8,215,090 B2 * | 7/2012 | Ishikawa | A01D 34/82 56/16.7 |
| 9,303,679 B2 * | 4/2016 | Dechant | F16B 41/002 |
| 9,790,974 B2 * | 10/2017 | Holt | F16B 21/02 |
| 10,458,501 B2 | 10/2019 | Harne | |
| 2008/0145180 A1 * | 6/2008 | Hermann | F16B 41/002 411/378 |
| 2013/0071203 A1 * | 3/2013 | Hay | F16B 5/0258 411/111 |
| 2019/0120281 A1 | 4/2019 | Lutter | |

FOREIGN PATENT DOCUMENTS

| | | | |
|---|---|---|---|
| EP | 0986489 B1 * | 4/2008 | F04D 29/668 |
| GB | 1462839 | 1/1977 | |
| WO | 2015126257 | 8/2015 | |

* cited by examiner

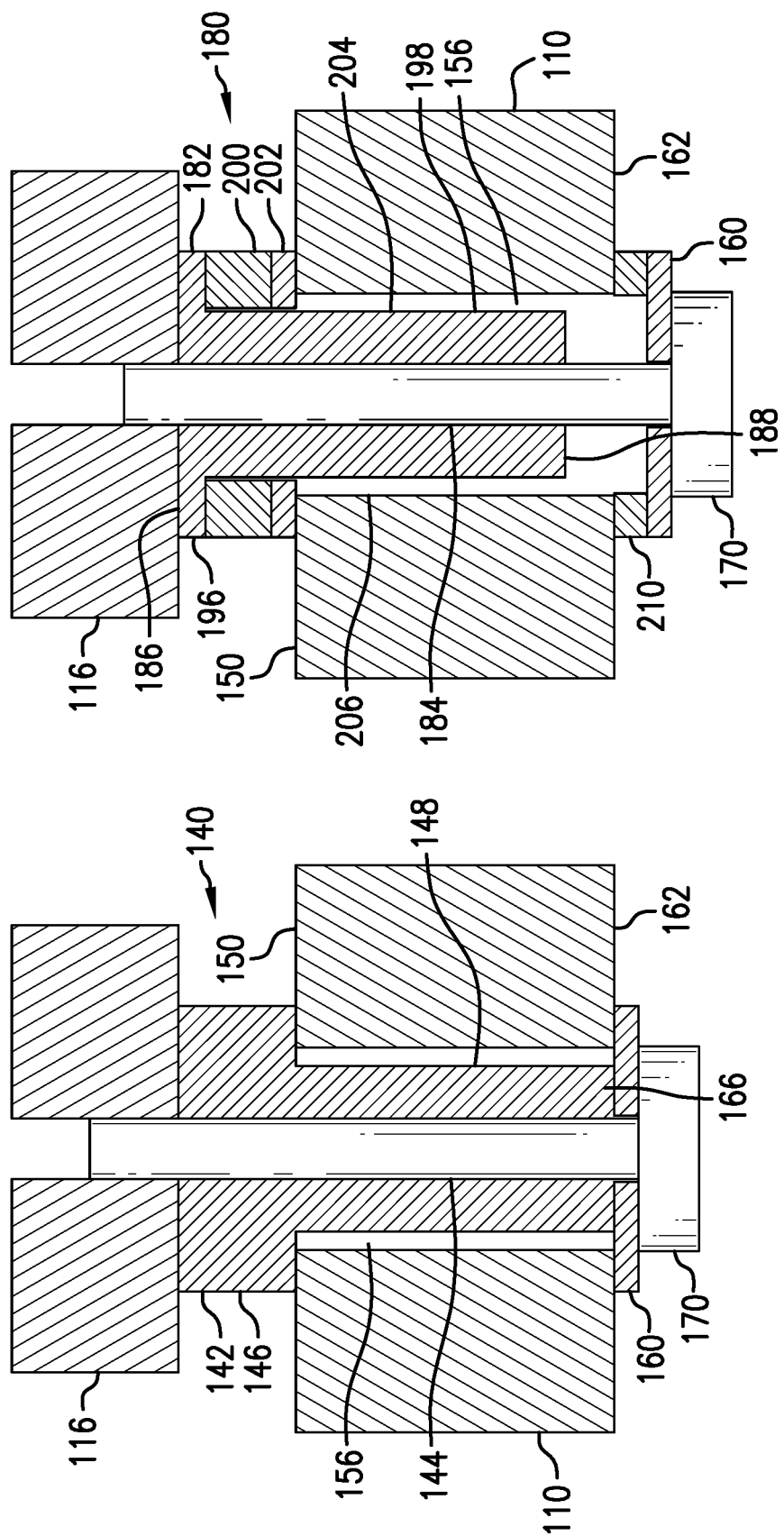

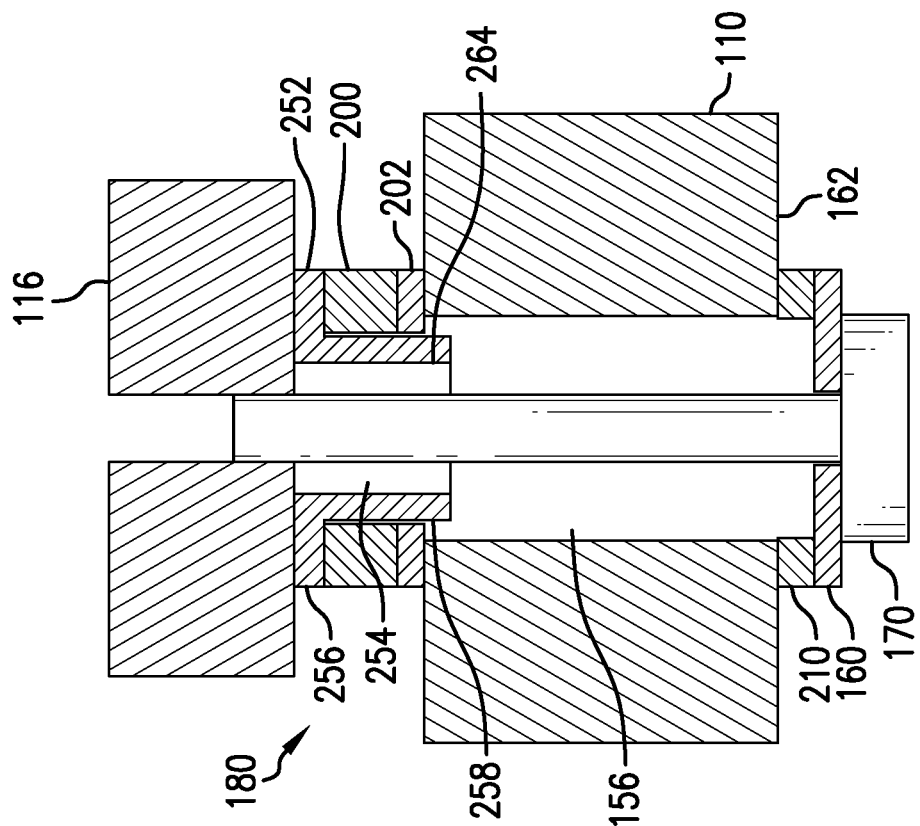
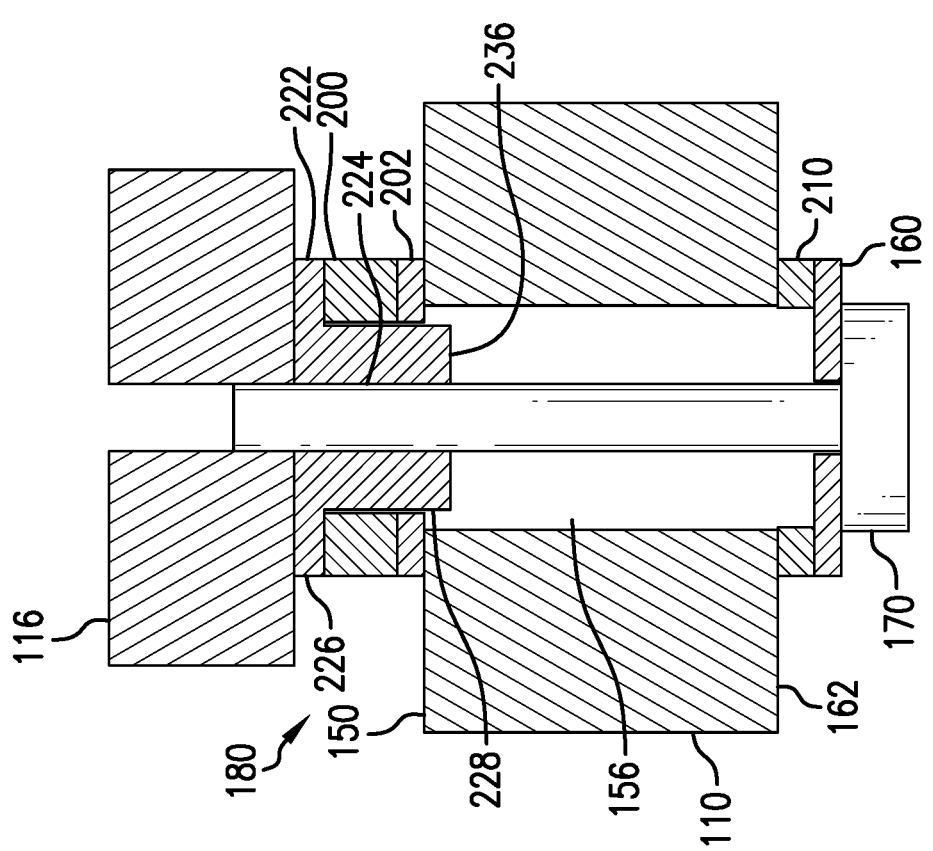

ENGINE MOUNTING STRUCTURE FOR WALK-BEHIND WHEELED MACHINE

BACKGROUND

Current designs in walk-behind power equipment or wheeled machines often have an internal combustion engine that is rigidly mounted to a base or frame. This rigid mount allows significant vibration for normal engine operation to be transmitted to the frame, potentially making handling the equipment uncomfortable or exciting panels and other components that, in turn, create unwanted noise. Elastomeric bushings can reduce both unwanted effects, but the bushings need to be properly located, provide similar engine location, be installed with a desired pre-load, and have all support components (i.e., washers and spacers) properly oriented and aligned for correct operation.

BRIEF DESCRIPTION

According to one aspect, a manually operated wheeled machine comprises a housing and an engine mounted to the housing via a mounting structure. The mounting structure includes a tubular spacer defining a through hole. The spacer has a first end directly abutting the engine and a second end inserted in a mounting hole extended through the housing. The second end of the spacer is offset axially inwardly from a lower surface of the housing. A damping element axially mounted to the spacer is directly engaged to the first end of the spacer. A washer axially mounted to the spacer is interposed between and directly contacts each of the damping element and an upper surface of the housing. A fastener is extended through the mounting hole and the spacer from the lower surface of the housing for connection with the engine.

According to another aspect, a manually operated wheeled machine comprises a housing and an engine mounted to the housing via a mounting structure. The mounting structure includes a tubular spacer defining a through hole. The spacer includes a head and a body depending from the head. The head of the spacer directly abuts the engine, and the body of the spacer is inserted in a mounting hole extended through the housing. A distal end of the body is offset axially inwardly from a lower surface of the housing. A damping element axially mounted to the body is directly engaged to the head of the spacer. A washer axially mounted to the body is interposed between and directly contacts each of the damping element and an upper surface of the housing. A fastener is extended through the mounting hole and the spacer from the lower surface of the housing for connection with the engine. The spacer has an exterior surface spaced entirely from both the upper surface of the housing and an inner surface of the housing that defines the mounting hole, and the damping element prevents a direct axial load path between the spacer and the washer.

According to another aspect, a mounting structure for mounting an engine to a housing of a manually operated wheeled machine is provided. The mounting structure comprises a tubular spacer defining a through hole. The spacer includes a head and a body depending from the head. A distal end of the body is outwardly flared and extended substantially parallel to the head. A damping element and a washer are each axially mounted to the body. The washer is interposed between the damping element and the flared distal end of the body. The spacer, the damping element and the washer together define a removable damping unit for positioning between the engine and the housing, and the flared distal end is sized for insertion into a mounting hole defined through the housing.

BRIEF DESCRIPTION OF THE DRAWINGS

FIG. 2 is a schematic cross-sectional view of a mounting structure for securing an engine to a housing of the lawn mower of FIG. 1.

FIG. 3 is a schematic cross-sectional view of an exemplary mounting structure for securing the engine to the housing of the lawn mower of FIG. 1 according to one aspect of the present disclosure.

FIG. 4 is a schematic cross-sectional view of an exemplary mounting structure according to another aspect of the present disclosure.

FIG. 5 is a schematic cross-sectional view of an exemplary mounting structure according to another aspect of the present disclosure.

DETAILED DESCRIPTION

Figure 1:
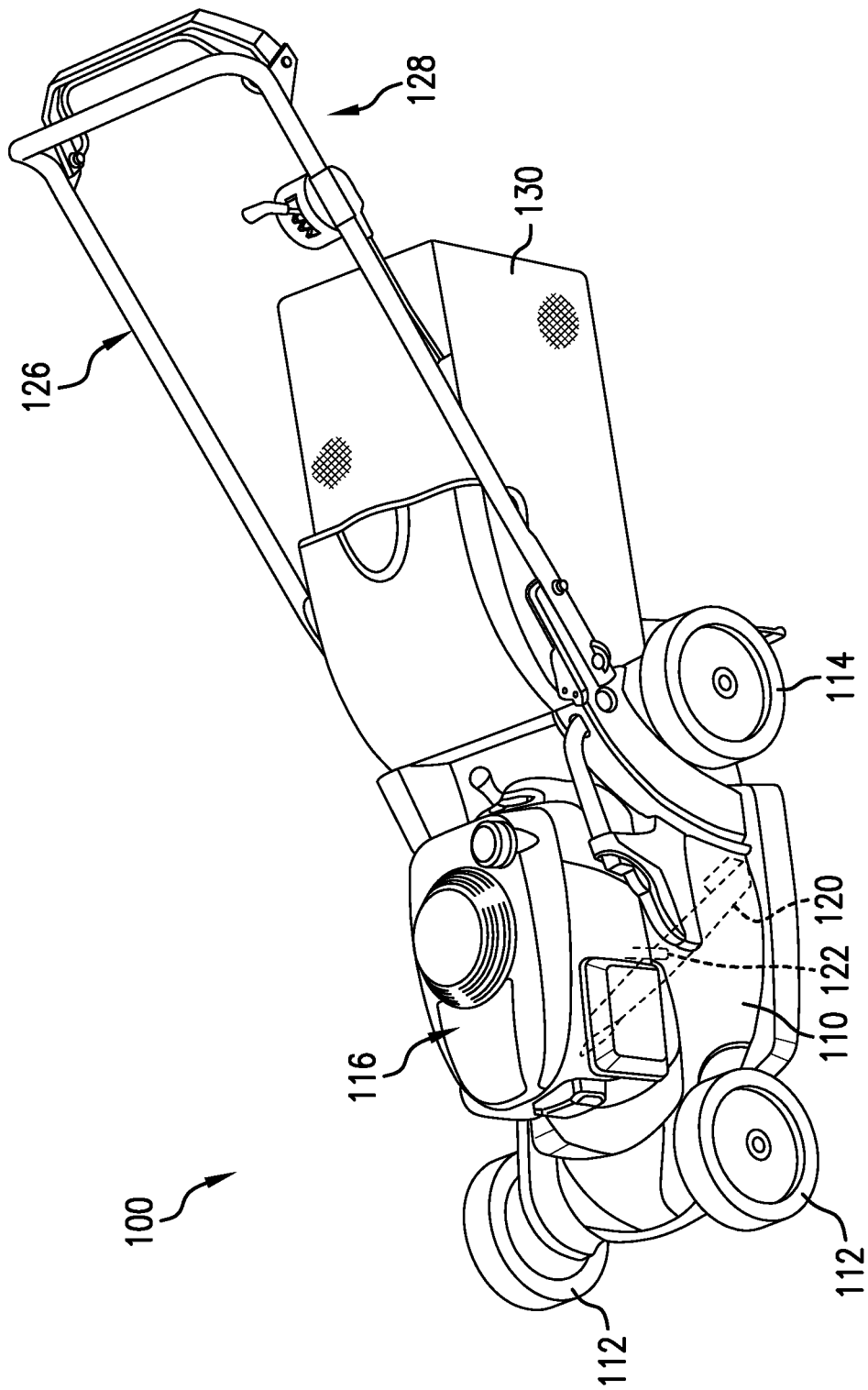
FIG. 1 is a schematic perspective view of a manually operated wheeled machine in the form of a walk-behind self-propelled lawn mower.

It should, of course, be understood that the description and drawings herein are merely illustrative and that various modifications and changes can be made in the structures disclosed without departing from the present disclosure. For purposes of description herein, spatially relative terms relate to the invention as oriented in the figures. Referring now to the drawings, wherein like numerals refer to like parts throughout the several views, FIG. 1 schematically illustrates a walk-behind, self-propelled lawn mower 100 that will be described as an example embodiment of a manually operated wheeled machine according to the present invention. However, it should be noted that the wheeled machine can be a wide variety of manually operated power implements, including various types of lawn mowers, power carriers (i.e., wheelbarrows), snow throwers, and the like; the lawn mower 100 merely exemplifies the present disclosure.

As schematically illustrated in FIG. 1, the lawn mower 100 has a blade housing 110 carried by front wheels 112 and rear drive wheels 114 (the right rear drive wheel is not shown because FIG. 1 is a view of the lawn mower 100 taken from one side). Mounted atop the housing 110 is a prime mover 116, which is an internal combustion engine in the embodiment depicted in FIG. 1, but could alternatively be an electric motor. The housing 110 is composed of, for example, a resin-molded article and also serves as a chassis. The engine 116 is laid over and bolted to the upper surface of the housing 110 and thereby integrally assembled therewith. As is well known, a cutting blade 120 housed in a central interior part of the housing 110 is connected to an output shaft 122 of the engine 116. The engine 116 can be used to drive the rear wheels 114 via a variable speed drive (not shown), whereby the lawn mower 100 is propelled forward automatically, and lawn-mowing operations are continued. An operating handle 126 extends obliquely from the rear of the housing 110 in a rearward and upward direction and includes operator controls 128. A cut-grass storage unit 130 can be connected to the rear of the housing.

A known attachment or mounting structure 140 of the engine 116 in relation to the housing 110 will be described with reference to FIG. 2. The mounting structure 140 includes a tubular spacer 142 defining a through hole 144. The spacer 142 integrally includes a head 146 and a body 148 depending from the head. The head 146 is sized to directly engage both an upper surface 150 of the housing 110 and the engine 116, such that the engine is directly supported on the housing via the head of the spacer 142. The body 148 is inserted in a mounting hole 156 extended through the housing 110. A washer or bearing plate 160 is provided at a lower surface 162 of the housing 110, with a distal end 166 of the body 148 directly engaged to the washer 160. A fastener 170 is extended through the washer 160 and the spacer 142 from the lower surface 162 of the housing 110 for connection with the engine 116. With the known mounting structure 140, there is a direct axial load path through touching metal parts (i.e., the engine 116, spacer 142 and the washer 160) allowing vibration resulting from driving of the engine 116 to be transmitted to the housing 110. In the case of the depicted lawn mower 100, this vibration can then be transmitted from the housing 110 to the handle 126, which can cause strain to the operator of the lawn mower.

To mitigate this unwanted vibration transferred to the handle 126 of the lawn mower 100, FIG. 3 depicts an exemplary mounting structure 180 for mounting the engine 116 to the housing 110 according to the present disclosure. The mounting structure 180 includes a tubular spacer 182 defining a through hole 184. The spacer 182 has a first end 186 directly abutting the engine 116 and a second end 188 inserted in the mounting hole 156 extended through the housing 110. The first end 186 of the spacer 182 is defined by a head 196 and the second end 188 of the spacer 182 is defined by a body 198 depending from the head 196. In contrast to the known spacer 142 described above, the head 196 of the spacer 182 has a reduced axial dimension (i.e., thickness) which axially spaces the head 196 from the upper surface 150 of the housing 110. However, because the cutting blade 120 is rigidly attached to the output shaft 122 of the engine 116, the engine 116 must maintain a predetermined spacing from the housing 110. To this end, the mounting structure 180 includes a damping element 200 and a washer 202 each axially mounted to the body 198 of the spacer 182. The damping element 200, which can be formed of an elastomeric material or comprise a damping structure, is directly engaged to the first end 186 or head 196 of the spacer 182. The washer 202 is interposed between and directly contacts each of the damping element 200 and an upper surface 150 of the housing 110. Therefore, with this arrangement of the mounting structure 180, the spacing between the engine 116 and the housing 110 is maintained.

In the depicted aspect, the spacer 182 has an exterior surface 204 (i.e., an outer perimeter) spaced entirely from both the upper surface 150 of the housing 110 and an inner surface 206 of the housing 110 that defines the mounting hole 156. The damping element 200 separates the spacer 182 from the washer 202 overlying the upper surface 150 of the housing, and therefore prevents a direct axial load path between the spacer 182 and the washer 202. In addition, each of the damping element 200 and the washer 202 can have an inner diameter greater than an outer diameter of the body 198 of the spacer 182. This dimensioning provides a small gap between each of the damping element 200 and the washer 202 and the body 198 to prevent radial transmission of vibration from the spacer 182. In further contrast to the known spacer 142, the second end 188 of the spacer 182 is offset axially inwardly from the lower surface 162 of the housing 110 so that the second end 188 is not in direct contact with the washer or bearing plate 160. And to further mitigate the vibration transmitted from the engine, a second damping element 210 directly abuts the lower surface 162 of the housing, with the bearing plate or washer 160 interposed between and directly contacting each of the second damping element 210 and the fastener 170. To secure the engine to the housing, the fastener 170 is extended through the washer 160, the second damping element 210 and the spacer 182 from the lower surface 162 of the housing 110 for connection with the engine 116.

According to the aspect of FIG. 3, the second end 188 of the spacer 182 is located axially closer to the lower surface 162 of the housing 110 than the upper surface 150 of the housing; although, this is not required. For example, FIG. 4 depicts another aspect of a tubular spacer 222 for the exemplary mounting structure 180. The spacer 222 defines a through hole 224 and integrally includes a head 226 and a body 228 depending from the head. The head 226 is dimensioned similar to the head 196 of the spacer 182, with the damping element 200 and the washer 202 mounted axially on the spacer 222 between the head 226 and the upper surface 150 of the housing 110. Again, to prevent radial transmission of vibration from the spacer 222, each of the damping element 200 and the washer 202 can have an inner diameter greater than an outer diameter of the body 228. A second or distal end 236 of the spacer 222, which is inserted in the mounting hole 156 of the housing 110, is located axially closer to the upper surface 150 of the housing than the lower surface 162 of the housing. By way of example, the spacer can have an axial dimension such that the second end 236 of the spacer 222 only slightly penetrates (e.g., by an axial depth of 1 mm to 10 mm) the mounting hole 156 to maintain an axial alignment of the mounting structure 180 for the fastener 170.

In each of the aspects of the spacers 182, 222 depicted respectively in FIGS. 3 and 4, an inner diameter of each through hole 184, 224 is sized to limit a gap between the spacer and that portion of the fastener 170 extended through the spacer 182, 222; although, this is not required. For example, FIG. 5 depicts another aspect of a tubular spacer 252 for the exemplary mounting structure 180. The spacer 252 defines a through hole 254 and integrally includes a head 256 and a body 258 depending from the head. As shown, a footprint of the spacer 252 can substantially match that of the spacer 222, with the damping element 200 and the washer 202 mounted axially on the spacer 252 between the head 256 and the upper surface 150 of the housing 110 and the body 258 of the spacer 252 slightly extended into the mounting hole 156. Similar to the previously described aspects, to prevent radial transmission of vibration from the spacer 252, each of the damping element 200 and the washer 202 can have an inner diameter greater than an outer diameter of the body 258. In FIG. 5, a radial thickness of the spacer 252 is reduced, which allows the through hole 254 to have an enlarged inner diameter as compared to the through holes of the previously described spacers 182, 222. With the oversized inner diameter, an inner surface 264 of the spacer 252 that defines the through hole 254 is spaced entirely from that portion of the fastener 170 extended through the spacer. And because the spacer 252 is not in direct contact with the fastener 170, vibrations transmitted from the engine 116 into the spacer 252 are not further directed through the fastener 170, and resulting vibrations of the housing 110 are reduced. Additional benefits of the exemplary spacer 252 may include using less material leading to lighter weight of the mounting element, lower cost, and increased ease of manufacture.

Figure 7:
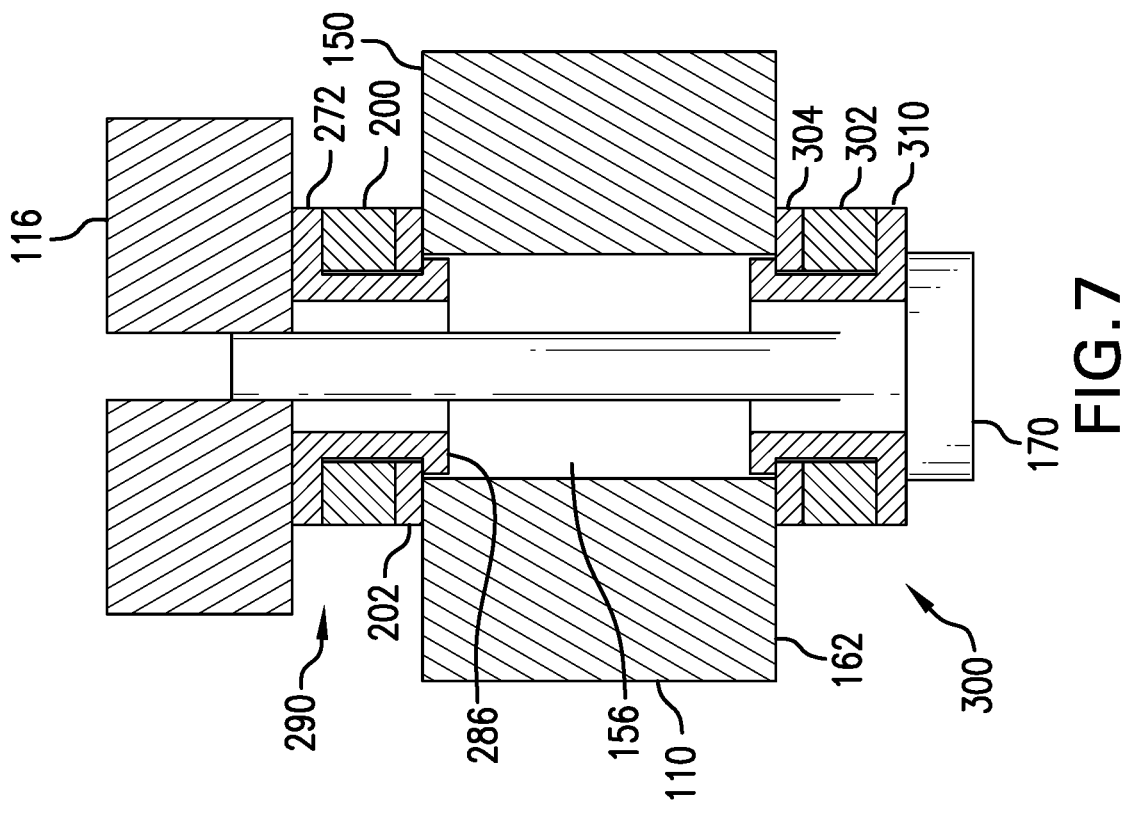
FIGS. 6 and 7 are schematic cross-sectional views of an exemplary mounting structure according to another aspect of the present disclosure.
Figure 6:
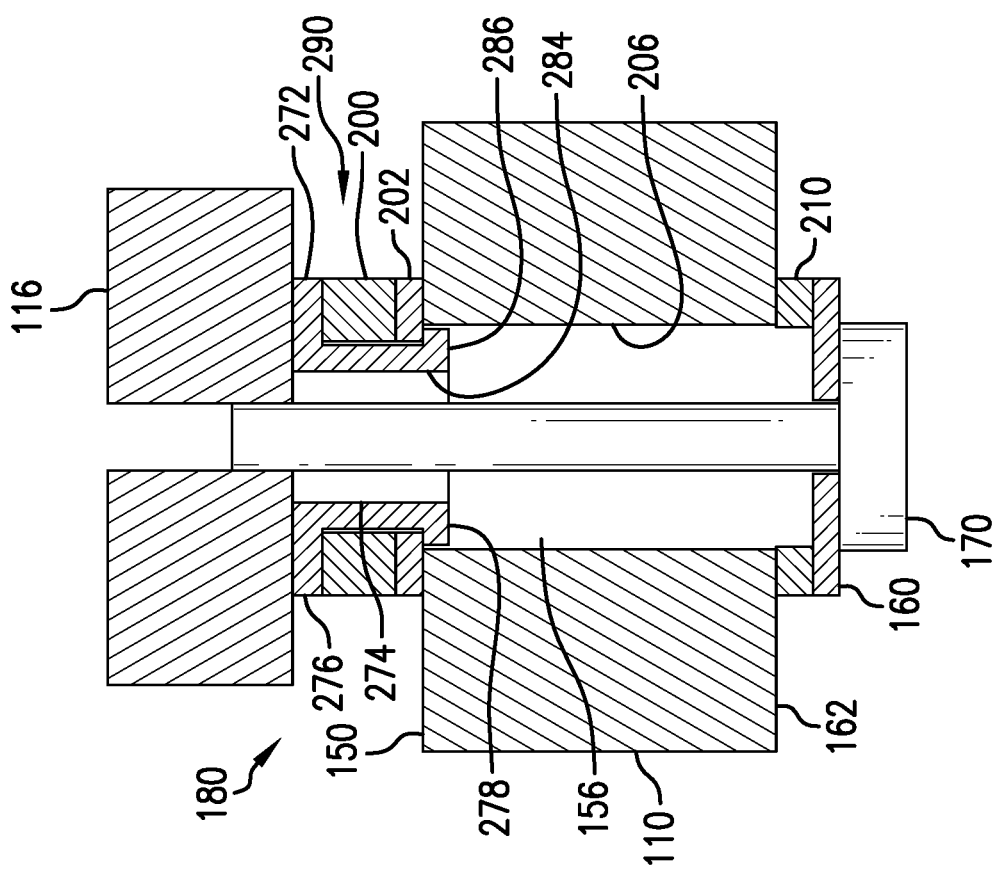

FIGS. 6 and 7 depict another aspect of the exemplary mounting structure 180. Similar to the previous embodiments, the mounting structure 180 includes a tubular spacer 272 defining a through hole 274. The spacer 272 integrally includes a head 276 and a body 278 depending from the head. Similar to the through hole 254 of the spacer 252, the through hole 254 has an oversized inner diameter which entirely spaces an inner surface 284 of the spacer 272 that defines the through hole 274 from that portion of the fastener 170 extended through the spacer. In the illustrated aspect, a second end or distal end 286 of the spacer 272 is outwardly flared and extended substantially parallel to the head 276. The damping element 200 and the washer 202 are each axially mounted to the body 278, with an inner diameter of each of the damping element 200 and the washer 202 sized greater than an outer diameter of the body 278 to prevent radial transmission of vibration from the spacer 272. The damping element 200 directly abuts the head 276 and the washer 202 is interposed between the damping element and the flared distal end 286 of the spacer 272. With this arrangement, the damping element 200 and the washer 202 are captured by the spacer 252, such that the spacer 272, the damping element 200 and the washer 202 together define a removable damping unit 290 for mounting of the engine 116 to the housing 110. The damping unit 290 is positioned between the engine 116 and the housing 110, and the flared distal end 286 is sized for insertion into the mounting hole 156 defined through the housing 110. The flared distal end 286 is also radially dimensioned so that an edge of the flared distal end is spaced inwardly from the inner surface 206 of the housing 110 that defines the mounting hole 156. This dimensioning again ensures that an entirety of the spacer 272 is not in direct contact with the housing 110. Again, because the damping element 200 separates the head 276 of the spacer 272 and the washer 202 that overlays the upper surface 150 of the housing 110, a direct axial load path between the spacer 272 and the washer 202 is prevented which, in turn, mitigates vibration resulting from driving of the engine 116 from being transmitted to the housing 110.

In FIG. 6, the second damping element 210 directly abuts the lower surface 162 of the housing, with the bearing plate or washer 160 interposed between and directly contacting each of the second damping element 210 and the fastener 170. The fastener 170 is extended through the washer 160, the second damping element 210 and the damping unit 290 from the lower surface 162 of the housing 110 for connection with the engine 116. In FIG. 7, instead of the second damping element 210 and the bearing plate or washer 160, a removable second damping unit 300 is positioned between the lower surface 162 of the housing 110 and the fastener 170. As shown, the second damping unit 300 can be constructed similar to the damping unit 290 and includes a damping element 302 and a washer 304 captured by a spacer 310. The fastener 170 is extended through the second damping unit 300 and the damping unit 290 from the lower surface 162 of the housing 110 for connection with the engine 116. It should be appreciated that with the use of the removable damping units 290, 300 the mounting of the engine 116 to the housing 110 can be simplified, thereby reducing the time of assembly for the lawn mower 100.

It will be appreciated that the above-disclosed features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A manually operated wheeled machine comprising:
   a housing and an engine mounted to the housing via a mounting structure, wherein the mounting structure includes:
   a tubular spacer defining a through hole, the spacer having a first end directly abutting the engine and a second end inserted in a mounting hole extended through the housing, the second end of the spacer is offset axially inwardly from a lower surface of the housing,
   a damping element and a washer each axially mounted to the spacer, the damping element directly engaged to the first end of the spacer, and the washer interposed between and directly contacting each of the damping element and an upper surface of the housing, and
   a fastener extended through the mounting hole and the spacer from the lower surface of the housing for connection with the engine.

2. The machine of claim 1, wherein the mounting structure includes a second damping element directly abutting the lower surface of the housing, the fastener extended through the second damping element.

3. The machine of claim 2, wherein the mounting structure includes a second washer interposed between and directly contacting each of the second damping element and the fastener, the fastener extended through the second washer.

4. The machine of claim 1, wherein the second end of the spacer is located axially closer to the upper surface of the housing than the lower surface of the housing.

5. The machine of claim 1, wherein an inner surface of the spacer that defines the through hole is spaced entirely from a portion of the fastener extended through the spacer.

6. The machine of claim 1, wherein the second end of the spacer is outwardly flared beneath the washer.

7. The machine of claim 6, wherein an edge of the flared second end of the spacer is radially spaced from an inner surface of the housing that defines the mounting hole.

8. The machine of claim 6, wherein the damping element and the washer are captured between the first end of the spacer and the flared second end of the spacer, wherein the spacer, the damping element and the washer together define a removable first damping unit positioned between the engine and the upper surface of the housing.

9. The machine of claim 8, wherein an inner surface of the first damping unit is spaced entirely from a portion of the fastener extended through the first damping unit.

10. The machine of claim 8, further including a second damping element and a second washer captured by a second spacer to define a removable second damping unit, the second damping unit positioned between the lower surface of the housing and the fastener.

11. A manually operated wheeled machine comprising:
    a housing and an engine mounted to the housing via a mounting structure, wherein the mounting structure includes:
    a tubular spacer defining a through hole, the spacer includes a head and a body depending from the head, the head directly abutting the engine, the body inserted in a mounting hole extended through the housing and a distal end of the body is offset axially inwardly from a lower surface of the housing,
    a damping element and a washer each axially mounted to the body, the damping element directly engaged to the head of the spacer, the washer interposed between and directly contacting each of the damping element and an upper surface of the housing, and a fastener extended through the mounting hole and the spacer from the lower surface of the housing for connection with the engine, wherein the spacer has an exterior surface spaced entirely from both the upper surface of the housing and an inner surface of the housing that defines the mounting hole, and the damping element prevents a direct axial load path between the spacer and the washer.

12. The machine of claim 11, wherein the distal end of the body is located axially closer to the upper surface of the housing than the lower surface of the housing.

13. The machine of claim 11, wherein the distal end of the body is outwardly flared beneath the washer, the flared distal end extended substantially parallel to the head.

14. The machine of claim 13, wherein the damping element and the washer are captured between the head and the flared distal end of the spacer, wherein the spacer, the damping element and the washer together define a removable first damping unit positioned between the engine and the upper surface of the housing.

15. The machine of claim 14, wherein an inner surface of the first damping unit is spaced entirely from a portion of the fastener extended through the first damping unit, and an edge of the flared distal end of the body is radially spaced from an inner surface of the housing that defines the mounting hole.

16. The machine of claim 14, further including a second damping element and a second washer captured by a second spacer to define a removable second damping unit, the second damping unit positioned between the lower surface of the housing and the fastener.

17. The machine of claim 11, wherein the mounting structure includes a second damping element directly abutting the lower surface of the housing and a second washer interposed between and directly contacting each of the second damping element and the fastener, the fastener extended through the second washer and the second damping element.

* * * * *